No. 636,772. Patented Nov. 14, 1899.
J. W. DUTY.
NUT LOCK.
(Application filed Aug. 10, 1899.)
(No Model.)
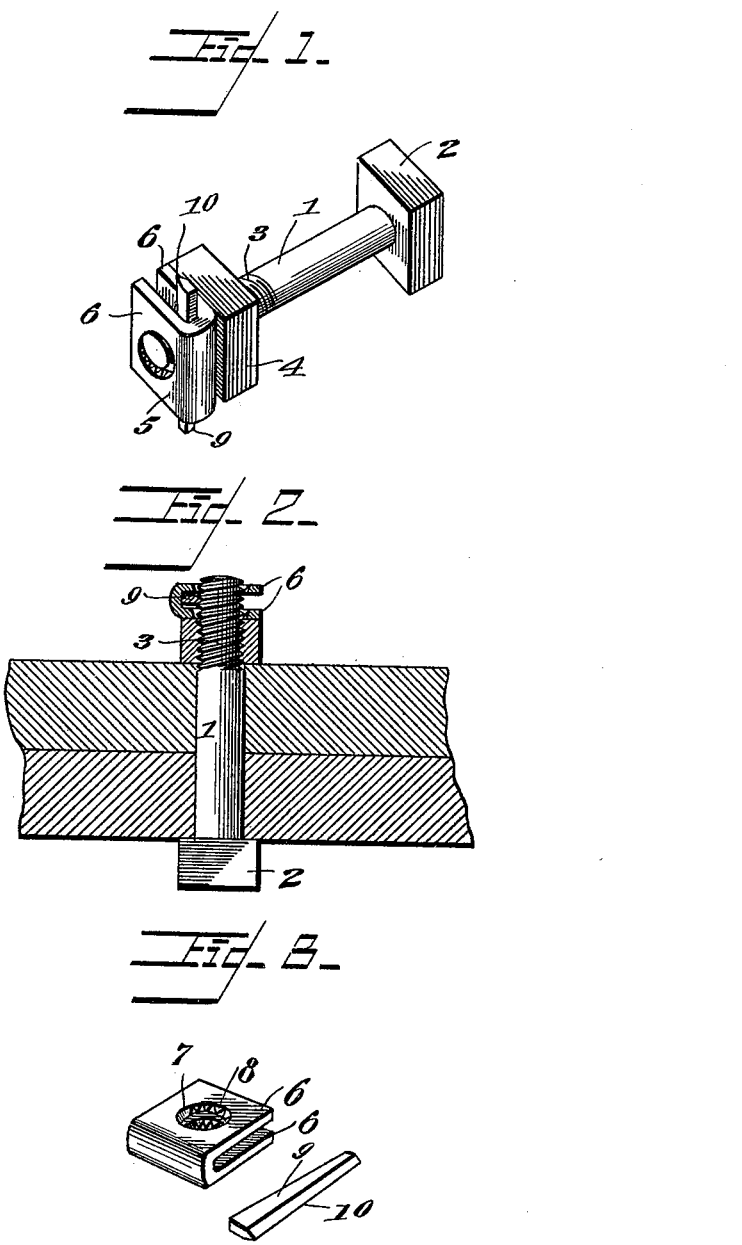
Witnesses
F. D. Ammen
Chas. S. Hoyer
John W. Duty Inventor
By his Attorneys,
C. A. Snow & Co.
THE NORRIS PETERS CO., PHOTO-LITHO., WASHINGTON, D. C.

UNITED STATES PATENT OFFICE.

JOHN WALTER DUTY, OF BEARSVILLE, WEST VIRGINIA, ASSIGNOR TO MAYLEN T. DAVIS, OF SAME PLACE.

NUT-LOCK.

SPECIFICATION forming part of Letters Patent No. 636,772, dated November 14, 1899.

Application filed August 10, 1899. Serial No. 726,809. (No model.)

*To all whom it may concern:*

Be it known that I, JOHN WALTER DUTY, a citizen of the United States, residing at Bearsville, in the county of Tyler and State of West Virginia, have invented a new and useful Nut-Lock, of which the following is a specification.

This invention relates to nut-locks; and the object in view is to provide a simple and convenient device of this character for securely holding a nut on a bolt against loosening by vibration or from other causes and wherein marring or mutilation of the bolt-threads and special construction of the nut are entirely avoided, thus reducing the cost of such devices.

Other objects and advantages will appear in the subjoined description and be hereinafter particularly claimed, the preferred embodiment of the invention being illustrated in the accompanying drawings and susceptible of changes in the proportions, size, and minor details of construction within the purview of the claims, and in which—

Figure 1 is a perspective view of a bolt and nut, showing the improved locking devices applied thereto. Fig. 2 is a sectional view showing the bolt and nut applied in connecting position and the mode of instituting a lock for the nut by the improved attachments. Fig. 3 shows detail perspective views of the parts of the improved attachment.

Similar numerals of reference designate corresponding parts in all the figures of the drawings.

The numeral 1 designates a bolt of any preferred form or dimensions and having a head 2 and a screw-threaded shank 3. On this bolt is adapted to be run a common form of nut 4, which will have dimensions corresponding to that of the bolt. The improved attachments comprise a stirrup-plate 5, consisting of a length of suitable hard metal doubled upon itself to form opposite legs 6, which are held spaced apart. Through these legs 6 enlarged openings 7 are formed and have in a portion of their walls teeth or serrations 8, the said teeth or serrations being located adjacent the free ends of the legs 6. The other part of the improvement consists of an elongated key-pin 9 of wedge-shaped form and having a knife-edge 10.

In assembling the parts the bolt 1 is first inserted through the device or devices which it is intended to hold and the nut 4 run onto the screw-threaded shank 3. The stirrup-plate 5 is next applied, and the openings 7 in the legs 6 thereof being considerably larger than the screw-threaded shank can be readily placed in position on the screw-threads exteriorly of the nut. The key-pin 9 is next driven through the stirrup-plate between the bend of the latter and the screw-threads of the shank, with the knife-edge 10 standing next to the said screw-threads. As the said key-pin is driven through the stirrup-plate the teeth 8 are drawn into the threads of the shank of the bolt and between portions of the latter. The teeth 8, being carried by the opposite legs 6, engage the threads of the shank of the bolt at separated points and prevent slipping of the said stirrup-plate, particularly when the key-pin is tightly jammed against the threads of the shank of the bolt, the knife-edge 10 of the said pin also firmly biting into the threads at a point intermediate the engagement of said teeth. The stirrup-plate bears flatly against the outer face of the nut, and the latter cannot shift in the least as long as the key-pin is firmly jammed in locking position. The stirrup-plate can be quickly removed by loosening and withdrawing the key-pin and the nut run off at will.

The stirrup-plate may be applied in either a right or left position, and in manufacturing the improved devices they will be made in different sizes to suit bolts of varying proportions. Furthermore, the improved attachments may be conveniently used on bolts and nuts now employed without requiring any rearrangement or special provision for the reception of the same and with but little additional cost.

Having thus described the invention, what is claimed, and desired to be secured by Letters Patent, is—

1. In a nut-lock, the combination of a bolt and nut, a stirrup-plate having openings in opposite legs thereof provided with teeth in a portion of their walls, and a wedge-shaped key-pin adapted to be driven through the said stirrup-plate to draw the teeth into the threads of the bolt.

2. In a nut-lock, the combination of a bolt and nut, a plate having openings therein of larger dimensions than the bolt and provided with teeth in a portion of their walls adapted to engage the screw-threads of the bolt, and a wedge-shaped key-pin having a knife-edge, said pin being driven through the plate to bind the same with the knife-edge next to the threads of the bolt.

3. In a nut-lock, the combination of a bolt and nut, a plate adapted to be fitted over the end of the bolt and having teeth in a portion of opposite parts thereof, and a wedge-shaped key-pin inserted through the plate and having a portion thereof in engagement with the screw-threads of the bolt at a point intermediate of the bearing of the teeth thereof.

In testimony that I claim the foregoing as my own I have hereto affixed my signature in the presence of two witnesses.

JOHN WALTER DUTY.

Witnesses:
   ANDREW J. MOORE,
   W. T. KNOX.